United States Patent [19]

Mennesson

[11] Patent Number: 4,463,817

[45] Date of Patent: Aug. 7, 1984

[54] ACTIVE AMBULATING DEVICE, OR WALKER

[75] Inventor: Jean-François R. Mennesson, Castelnau le Lez, France

[73] Assignee: Institut National da la Sante et de la Recherche Medicale - I.N.S.E.R.M., Paris, France

[21] Appl. No.: 469,904

[22] Filed: Feb. 25, 1983

[30] Foreign Application Priority Data

Feb. 26, 1982 [FR] France ................................ 82 03368

[51] Int. Cl.[3] .................................................. B60K 1/00

[52] U.S. Cl. ................................ .180/65.5; 128/25 R; 272/70.3; 280/87.02 W; 180/65.8

[58] Field of Search ............................ 180/210, 65 R; 280/87.02 R, 87.02 W, 87.04 R; 272/70, 70.3; 297/5; 128/25 R, 25 B, 24 R

[56] References Cited

U.S. PATENT DOCUMENTS

| | | | |
|---|---|---|---|
| 2,210,269 | 8/1940 | Taylor | 272/70 |
| 3,504,927 | 4/1970 | Seki | 272/70.3 |
| 3,621,819 | 11/1971 | Hooper | 272/70.3 |
| 3,992,023 | 11/1976 | Moorer | 280/87.02 R |
| 4,280,578 | 7/1981 | Perkins | 272/70 |

*Primary Examiner*—Joseph F. Peters, Jr.
*Assistant Examiner*—Ross Weaver
*Attorney, Agent, or Firm*—Bucknam and Archer

[57] ABSTRACT

The invention relates to an ambulating device, or walker, intended for teaching or re-education of motricity, which comprises a self-powered frame mounted on wheels, a carrier element in which a patient is placed, which comprises orifices for his legs to pass, and which is fixed on a mobile support which is connected to the frame while being free to move with respect thereto in at least one direction, and the mobile support is connected to the frame by relative motion sensors and the device comprises servo-control loops between the the sensors and the motors.

8 Claims, 7 Drawing Figures

ACTIVE AMBULATING DEVICE, OR WALKER

The present invention relates to active ambulating devices, or walkers, intended for teaching how to walk or for re-education.

The technical sector of the invention is the construction of self-powered apparatus intended for developing, restoring or renewing the faculties of locomotion of children or handicapped persons.

Teaching or re-education of motricity may be obtained by placing an individual in an artificial environment, for example in the water of a swimming pool, which reduces his weight and which facilitates his movements.

Exercising apparatus, for example bicycles, are also used, by means of which the patient trains himself to develop and rehabilitate certain muscles and certain elements of the locomoter system, or non-motorized walkers on which the patient leans and which he moves with him. With these apparatus, the patient must have muscular power and good balance.

Wheelchairs or passive motorized ambulating devices are also known which make it easier for the handicapped persons to travel between the re-education sessions, but which do not contribute to teaching how to walk.

One drawback of the known excercising devices and apparatus resides in the fact that they are used only during the re-education sessions, i.e. for a limited period of time and in an environment distinct from the one where the patient usually lives, which reduces their efficacy. Moreover, they do not enable the patient to experience walking, i.e. the proprioceptive sensation of walking. Finally, they require a conscious and active participation of the patient. In the case of young children having motricity disorders due to mental deficiencies, it is not always possible to obtain their active participation during the re-education sessions.

Known passive motorized ambulating devices which are intended for patients having only very weak motricity, leave the patients completely inactive, which increases their passivity and immobility.

It is an object of the present invention to provide active ambulating devices, or walkers, which overcome the drawbacks of the known methods and apparatus.

A further object of the invention is to provide active ambulating devices or walkers:

which bring into play all or part of the locomotor system;

which may operate in the patient's usual surroundings, either in hospital or at home;

which may be used in extended and continuous manner without tiring the patient and which amplify and develop the patient's weakest locomotive possibilities.

which make it possible to graduate the bearing forces on the ground and the degree of active participation of the patient.

which make it possible to pass, progressively, from a function of active re-education to a more passive function of transport, these two functions being adapted to be associated in various ways.

It is a further object of the invention to provide active ambulating devices, or walkers, which make it possible to teach backward children to walk more quickly and to cross this threshold which every one recognizes as an important step towards their subsequent development.

The active walkers according to the invention comprise, in known manner, a self-powered frame mounted on wheels of which at least one is a drive wheel, driven by a motor, and it also comprises a carrier element in which a patient is placed, which comprises orifices for his legs to pass and which is supported by the chassis at a height such that the patient's feet touch the ground.

The objects of the invention are attained by means of walkers which are characterized in that said carrier element is fixed on a mobile support which is connected to said self-powered frame by connecting means which enable it to move freely with respect to said frame in at least one direction; said mobile support is connected to said frame by at least one sensor which emits an electric signal proportional to one of the components of the relative movement of said support with respect to said frame; and it comprises servo-control loops which connect each of said sensors to one of said motors and which automatically control said motors to move said frame by a movement which corresponds, in direction and in intensity, to the relative movement of said support with respect to said frame.

According to a preferred embodiment, the self-powered frame is generally rectangular in form and it comprises vertical uprights at the corners; said mobile support is also generally rectangular in form, but is smaller, its sides being shorter than those of said frame and it is suspended from said uprights by four suspension members; the lower end of at least one of these suspension members is connected to said frame by a linear motion sensor, which emits an electric signal proportional to the component of the relative displacement of said lower end with respect to said frame which is parallel to the longitudinal axis of the frame, said frame comprises as many motorized wheels as sensors, which wheels are driven by a gear-down unit and each motor is connected to one of the sensors by a servo-control loop which automatically controls said motor in such a way that the signal emitted by said sensor is cancelled.

The invention results in new active ambulating devices, or walkers, which make it possible to correct, very efficiently, the deficiencies in motricity in children or in accident victims.

Experiments made on prototypes have shown that the walkers according to the invention very efficiently facilitate teaching or re-education of motricity. In fact, the weight of the body is supported by the carrier element, which relieves the patient accordingly. Moreover, the carrier support which is suspended from the self-powered frame or which rolls without friction thereon, moves at the slightest prompting of the patient and the self-powered frame immediately follows without requiring any muscular effort. This results in the patient seeing even the slightest beginnings of movements followed by a displacement, which incites him to continue.

In particular in children suffering from disorders in motricity due to a psychic inhibition, the walkers according to the invention make it possible to re-establish the self-confidence of the child who becomes conscious of his possibilities and the inhibition is very rapidly eliminated.

The walkers according to the invention comprise means such as connecting rods, flexion leaves, springs, which constitute a more or less rigid mechanical connection between the mobile support of the carrier element and the self-powered frame. The coefficient of elasticity or modulus of this connection may be varied in order progressively to meter the muscular efforts demanded of the patient as he makes progress.

The following possible applications of the walkers of the invention may be mentioned:

accelerated crossing of the step of walking in backward children which has a threshold effect for later development;

accelerated re-education of motricity after an osseous or muscular traumatism in a child or adult;

improved functional restoration of motricity after nervous lesions.

The invention will be more readily understood on reading the following description with reference to the accompanying drawings, in which.

Figure 1:
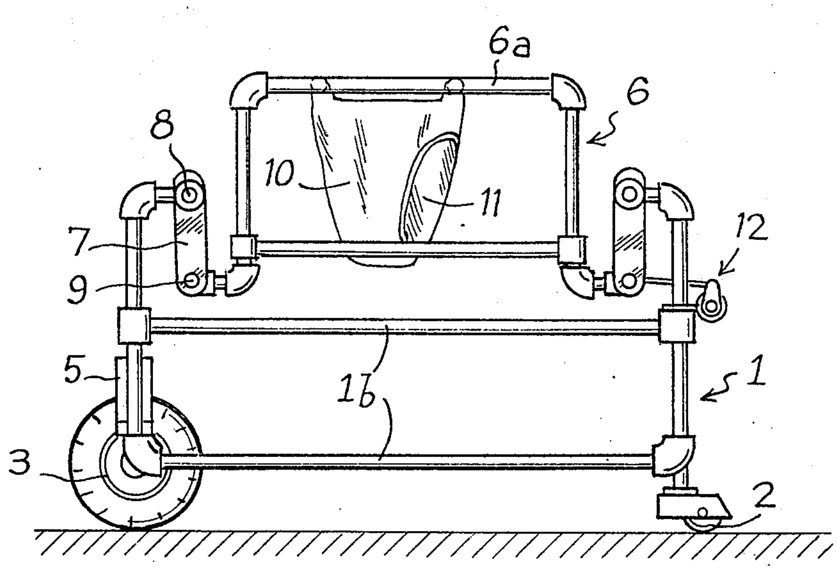
FIGS. 1 and 2 are a side view and a rear view of a first embodiment.
Figure 2:
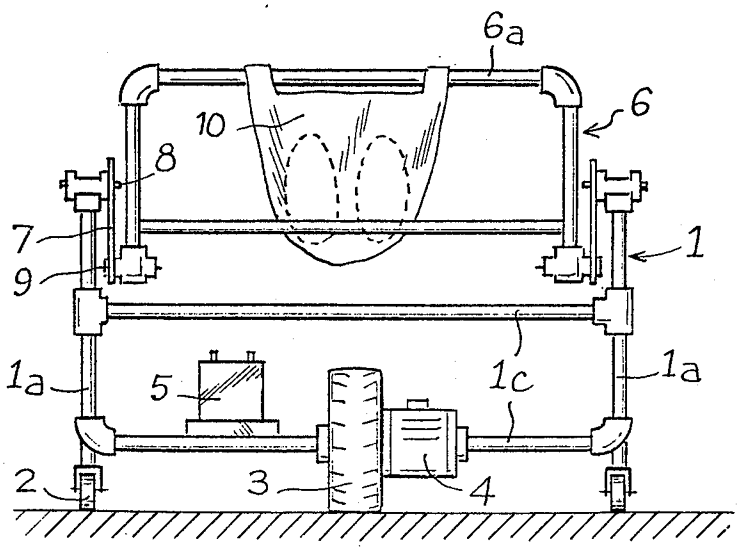

Referring now to the drawings, FIGS. 1 and 2 show an active ambulating device, or walker, which comprises a frame 1, for example a generally rectangular tubular frame which is mounted on bearing and self-steering wheels 2, i.e. wheels which are mounted on a support pivoting about a vertical axis, the axis of the wheel being eccentric with respect to said vertical axis. The frame 1 further comprises a drive wheel 3 which is placed in the axis of the frame parallel to the direction of walking and whose axis is transverse with respect to the frame. The drive wheel 3 is driven by a gear-down unit 4 whose electric motor is a reversible motor supplied for example by a battery 5 carried by the frame.

The frame 1 is composed of four vertical uprights 1*a* located at the four corners and connected together by side rails 1*b* and by cross members 1*c*.

A mobile carrier support 6, which is for example a rectangular tubular frame smaller than frame 1, is suspended from the four uprights 1*a* by four connecting rods 7. The connecting rods 7 are located in vertical, longitudinal planes, i.e. parallel to the direction of walking. The top end of each connecting rod is articulated on the frame about a horizontal pin 8 and the lower end of each connecting rod is articulated about a horizontal pin 9. The pins 8 and 9 are transverse, i.e. perpendicular to the direction of walking and parallel to the axis of the motorized wheel 3.

A carrier element 10 is suspended from the upper frame 6*a* of the support 6. The carrier 10 is for example a cloth carrier, in the from of breeches, comprising two orifices 11 through which a patient who is placed therein passes his legs. The height of the carrier support 6 is such that the patient's feet rest on the ground. In this way, most of the patient's weight is supported by the carrier 10 and transferred to the ground via the support 6, the connecting rods 7 and the frame 1. However, due to the contact of his feet with the ground, the patient may stand lightly on the ground and may exert on the carrier 10 a force which tends to displace the carrier with respect to the frame 1 by pivoting the four connecting rods about their suspension pin 8. One of the connecting rods is equipped with a sensor 12 which picks up one of the components of the relative movement of the support 6 with respect to frame 1 and which analogically converts the intensity of this component into an electric signal, for example a voltage, proportional to the intensity of the component measured.

It will be specified that the word movement is taken in a general sense and the term component of the movement denotes any vector which characterizes the relative movement and which may be the component in a determined direction of a linear or angular displacement, a velocity, a force corresponding to an acceleration, or of a torque.

FIGS. 1 and 2 show the simplest embodiment of a walker serving to stimulate walking in a straight line and in which, due to the suspension of the support 6 by the four connecting rods 7, the relative movement of the carrier with respect to the frame is a movement with one degree of freedom, in a rectilinear direction parallel to the longitudinal axis of the frame.

Figure 3:
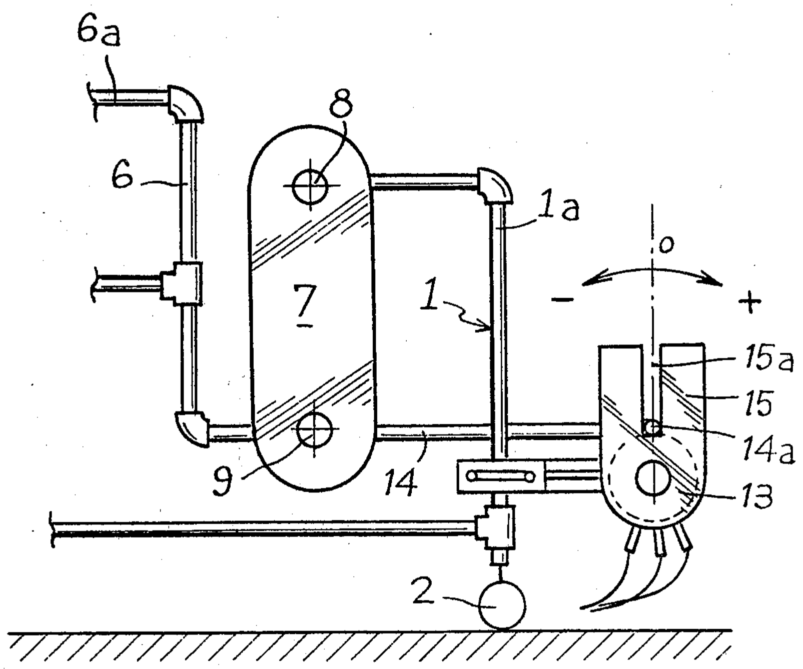
FIG. 3 is a partial view on a larger scale of the sensor of FIGS. 1 and 2.

FIG. 3 shows a view in elevation of the sensor 12, which is composed of a rotary potentiometer 13 which is fixed to the frame 1. It comprises a connecting rod 14 which connects the pivot pin 9 to the slider 15 of the potentiometer which comprises a notch 15*a* into which one end 14*a* of the connecting rod 14 penetrates. In this way, the relative movement of the frame 6 with respect to frame 1 is transmitted by the connecting rod 14 to the rotary slider 15 and the voltage emitted by the potentiometer varies, positively or negatively, about a reference value proportionally to the angle of pivot of the connecting rod 7. This voltage is amplified.

A servo-control device receives the amplified voltage and automatically actuates the motor 4 so as to cancel the difference between the voltage emitted and the reference voltage, which corresponds to an absolute displacement of the self-powered frame 1 with respect to the ground in the same direction and over the same length as the relative displacement of the carrier with respect to the frame.

In this example where the relative displacement of the carrier with respect to the frame is a one-way displacement, the self-powered frame 1 is equipped with one motorized wheel located in the longitudinal axis which displaces the self-powered frame in one direction.

It will be understood that, since the carrier support 6 is suspended from the frame 1 by four connecting rods, the slightest thrust that the patient exerts on the ground with his feet suffices to displace the carrier.

The pivot pins 8 and 9 are frictionless articulations, for example bearings. The drive wheel immediately displaces the self-powered frame by an equivalent length without the patient having to expend energy to obtain this displacement. Consequently, the patient's efforts are geared down and the patient, who can see the result of his efforts, is strongly incited to persevere, hence an effect of encouragement to make an effort.

The device according to FIGS. 1 and 2 makes it possible to regulate the effort demanded of the patient as he progresses. In fact, when the carrier support 6 leaves its position of stable equilibrium, the weight P of the patient exerts on the connecting rods a torque which returns the connecting rods towards the position of equilibrium and which is equal to $P \cdot l \sin \alpha$, l being the length of the connecting rod and $\alpha$ the angle of rotation. By adjusting the length of the connecting rods 7, the return torque can be varied and the patient is obliged, as he makes progress, to make a gradually greater effort to obtain the same relative displacement.

When the patient is sitting in the carrier 10, his hands are substantially at the level of the upper frame 6*a* from which the carrier is suspended. This frame 6*a* is located above the top end of the uprights 1*a* and sufficiently far away for the patient to be unable to reach the uprights with his hands and exert a traction which would cause a relative displacement of the carrier with respect to the frame and a connection therebetween, so that the self-powered frame 1 would move in a continuous movement without the patient having to exert any effort with his feet. The frame would then act like a passive self-powered carriage.

Figure 4:
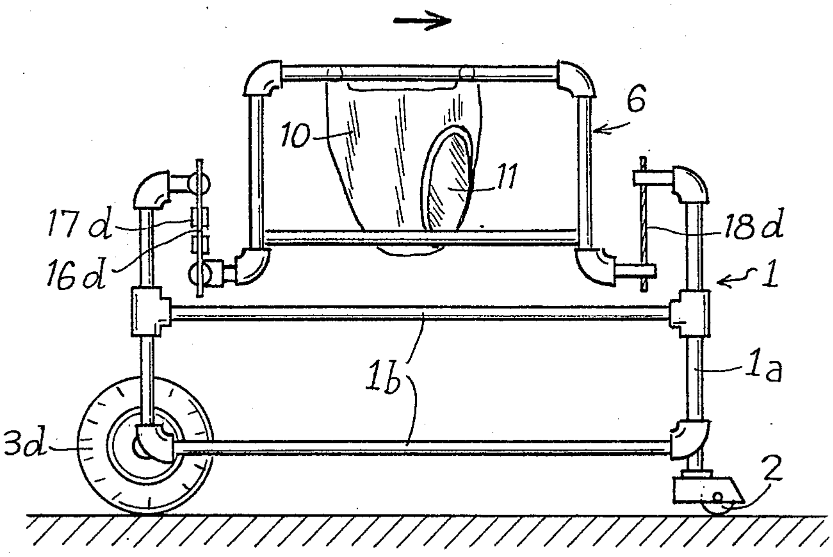
FIGS. 4 and 5 show a side view and a rear view of a second embodiment.
Figure 5:
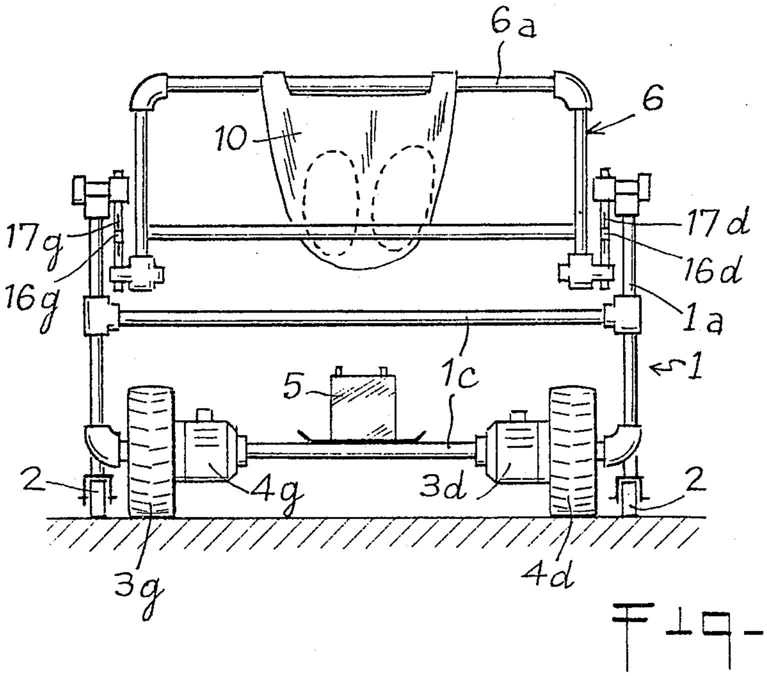

FIGS. 4 and 5 show another embodiment; elements similar to those in FIGS. 1 and 2 are represented by the same references.

The difference resides in the embodiment of the suspension of the support 6 and the relative motion sensors of the support 6 with respect to the self-powered frame 1.

In this embodiment, the carrier support 6 is suspended from the four uprights 1*a* by flexible suspending rods 16 which are for example flexible leaves located in transverse planes, so that, when the support 6 exerts a longitudinal effort on the leaves 16, the latter bend in the longitudinal direction.

Strain gauges 17, of the extensometer gauge type, are fixed on the flexible leaves 16 and they emit a voltage which is proportional to the flexion of the leaves and therefore to the force exerted thereon. According to a well known circuit assembly, a pair of extensometer gauges 17 is fixed on each face of the leaf and they are mounted in the four sides of a resistor bridge, the two leaves placed on the same face being mounted in series, and the current which circulates in the diagonal of the bridge is proportional to the flexion of the leaf.

The electric signal which circulates in the diagonal of the bridge is amplified and it automatically actuates the motor 4 in such a manner as to cancel the signal.

The embodiment according to FIGS. 4 and 5 is a walker having two degrees of freedom, i.e. a walker which enables the patient to move in an oblique position by pivoting.

In this case, two of the front or rear suspending rods, for example the two front suspending rods, are wires (18*d*, 18*g*) or curved flexible leaves which allow a freedom of movement of the carrier support with respect to the frame in all directions. The other two suspending rods, i.e. the rear ones, are flexion leaves 16, 16*g*, which are each equipped with a motion sensor 17*d*, 18*g* and the frame comprises two motorized wheels 3*d*, 3*g* located to the rear and symmetrical with respect to the longitudinal plane of symmetry. The motor 4*d*, 4*g* controlling each wheel is servo-controlled respectively by the electric signal delivered by the sensor located on the same side.

Pivoting of the carrier support with respect to the frame brings about a difference in the flexions of the two blades 16*d*, 16*g* carrying the sensors and this difference is found in the advance of the two wheels 3*d*, 3*g* so that the frame advances by rotating on itself through an angle equal to the angle of pivot of the carrier support and, at the end of movement, the frame is aligned with the carrier support and it has advanced in the same direction as the support and by the same length.

In the embodiment of FIGS. 4 and 5, when the carrier support moves, the flexible leaves 16 exert thereon a thrust which tends to return it to the position of equilibrium and the patient must exert an effort to overcome this thrust. By varying the length of the leaves and the flexibility thereof, for example by juxtaposing several flexion leaves, the effort demanded of the patient can be metered to obtain the same displacement, so that it is possible to increase this effort as the patient makes progress.

Figure 6:
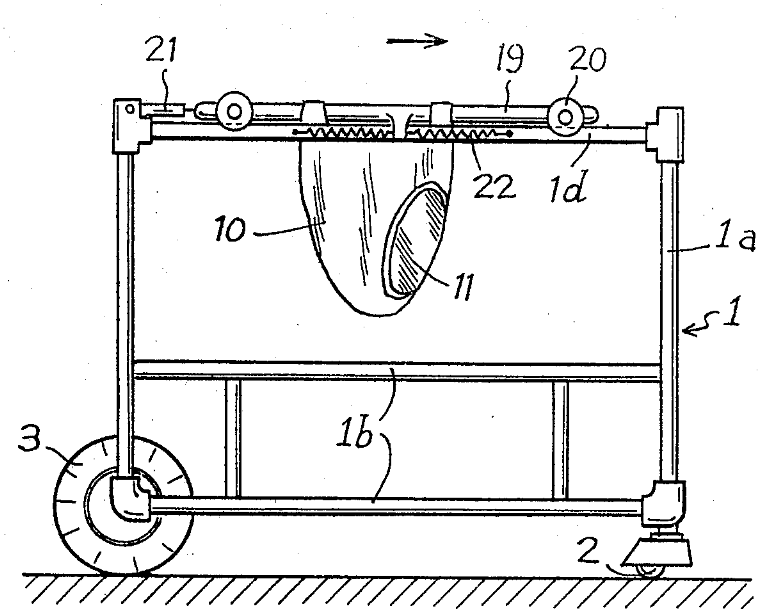
FIGS. 6 and 7 show a side view and a rear view of a third embodiment.
Figure 7:
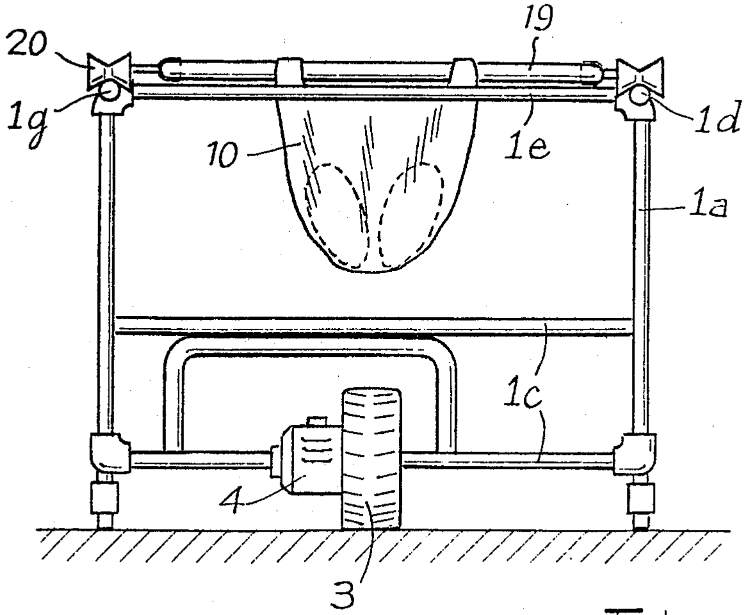

FIGS. 6 and 7 show a side view and a rear view of a third embodiment of a walker.

In this embodiment, the self-powered frame 1, 1*a*, 1*b*, 1*c* comprises an upper rectangular frame, formed by two side rails 1*d*, 1*g* and two cross members 1*e*. The carrier 10 is suspended from a carriage 19 which is equipped with rollers 20 which roll on the two side rails 1*d*, 1*g*.

A relative motion sensor 21 is placed between the carriage and one of the cross members 1*e* and it emits an electric signal proportional to the relative longitudinal displacement of the carrier with respect to its position of equilibrium. The carriage is connected to the self-powered frame by one or more springs 22 which tend to return the carriage towards a stable position of equilibrium.

The purpose of the springs 22 is to oblige the patient to make an effort to displace the carrier, so that it is possible to regulate this effort and increase the return force of the springs as a function of the progress made by the patient. The springs may be replaced by equivalent return devices, such as for example elastic buffers or pneumatic jacks.

The frame 1 comprises one drive wheel 3 located in the longitudinal axial plane, which is driven by a motor 4 which is controlled by the signal delivered by the sensor 21 in such a manner as to cancel the relative displacement of the carriage 19 with respect to the frame.

In this example, the self-powered frame moves under the combined action of the thrust which is transmitted thereto by the springs 22 and the action of the wheel 3. The more the springs 22 are tightened, the more the effort due to the patient intervenes in the displacement of the self-powered frame.

The sensor 21 may be any type of known linear motion sensor, for example a capacitive sensor or an inductive sensor comprising a mobile core movable inside a double inductance coil, or a resistive sensor comprising a resistor and a slider connected to the carriage which moves along the resistor or an optical sensor comprising a light source which illuminates a photoelectric receiver with an intensity which varies with distance, etc.

The walker according to the invention may be easily converted into a passive self-powered carriage. It suffices for the patient to lift his feet, grab hold of the frame with his hands and pull on his arms, and the self-powered frame will advance in a continuous movement, being converted into a motorized wheelchair.

The carrier 10 may be replaced by other equivalent forms of support, such as for example a seat, harness, saddle, etc. The word carrier is used in a general sense to denote any of these supports.

The device according to FIG. 3 makes it possible to adjust the coefficient of proportionality between the relative displacement of the carrier support and the voltage delivered by the potentiometer. To this end, it suffices to displace the position of the pivot pin 14*a* of the head of connecting rod 14 in the slot 15*a* of the slider.

In all the embodiments, the coefficient of proportionality may also be varied electronically by modifying the gain of the amplifiers of the signals delivered by the sensors.

What is claimed is:

1. An active ambulating device, or walker, intended for teaching or re-education of the motricity of a patient, comprising a self-powered frame mounted on wheels of which at least one is driven by a motor and a carrier element in which the patient is placed, which comprises orifices for his legs to pass and which is supported at a height such that the patient's feet touch the ground, wherein said carrier element is fixed on a mobile support which is connected to said self-powered frame by connecting means which enable it to move freely with respect to said frame in at least one direction; said mobile support is connected to said frame by at least one sensor which emits an electric signal proportional to one of the components of the relative movement of said support with respect to said frame; and it comprises servo-control loops which connect each of said sensors to one of said motors and which automatically control said motors to move said frame by a movement which corresponds, in direction and in intensity, to the relative movement of said support with respect to said frame.

2. A walker according to claim 1, wherein said self-powered frame is generally rectangular in form and it comprises vertical uprights at the corners; said mobile support is also generally rectangular in form, but is smaller, its sides being shorter than those of said frame and it is suspended from said uprights by four suspension members; the lower end of at least one of these suspension members is connected to said frame by a linear motion sensor, which emits an electric signal proportional to the component of the relative displacement of said lower end with respect to said frame which is parallel to the longitudinal axis of the frame, said frame comprises as many motorized wheels as sensors, which wheels are driven by a gear-down unit and each motor is connected to one of the sensors by a servo-control loop which automatically controls said motor in such a way that the signal emitted by said sensor is cancelled.

3. A walker according to claim 2, wherein said mobile support is suspended from said uprights by four connecting rods which are each pivoted about two horizontal axes transverse with respect to the frame.

4. A walker according to claim 3, wherein said sensor is a rotary potentiometer which is fixed to said frame and the slider of said potentiometer is connected to the lower end of one of the suspension connecting rods by a connecting rod parallel to the longitudinal axis of the frame.

5. A walker according to claim 2, wherein said mobile support is suspended from said uprights by flexion leaves located in transverse planes and at least one of these leaves bears strain gauges which deliver an electric signal proportional to the flexion of the leaf and to the longitudinal component of the relative displacement of said mobile support with respect to said frame.

6. A walker according to claim 5, wherein said mobile support is suspended from the two front or rear uprights by suspending members such as wires or curved flexible leaves which allow a relative displacement in all directions; it is suspended from the other two uprights by two flexion leaves located in a transverse plane which both bear strain gauges; said self-powered frame comprises two motorized wheels located on the same axle and at the same end as the two flexion leaves and the strain gauges located on each flexion leaf are connected by a servo-control loop to the motor which drives the motorized wheel located on the same side.

7. A walker according to claim 1, wherein said self-powered frame is generally rectangular in form and comprises two upper side rails; the mobile support is a carriage borne by rollers which roll on said side rails; said carriage is connected to the frame by an axial linear motion sensor; said self-powered frame comprises one motorized wheel located in the longitudinal axial plane and the motor driving said wheel is connected to said sensor by a servo-control loop.

8. A walker according to claim 7, wherein said carriage is connected to said frame by springs whose force may be regulated in order to meter the patient's effort as he progresses.

* * * * *